Figure 1:
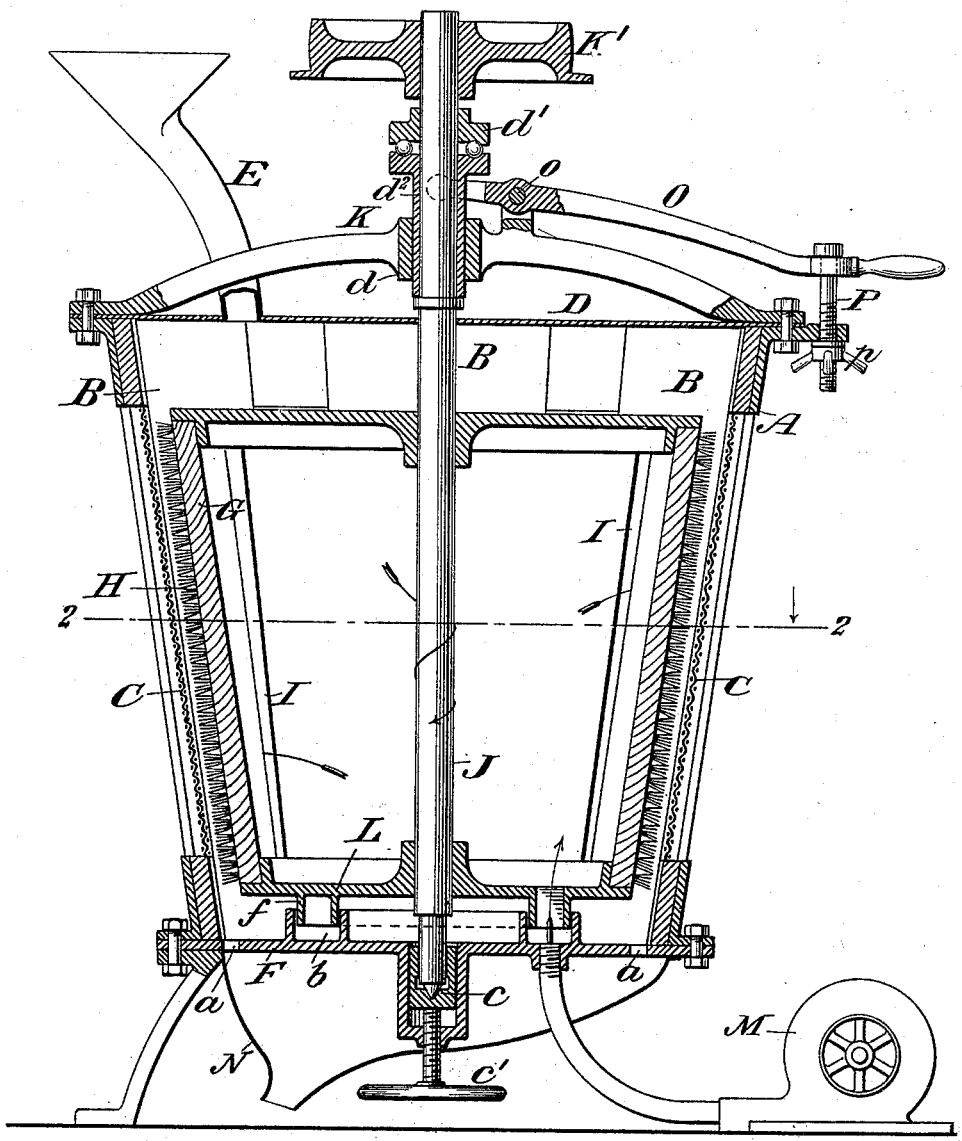

(No Model.) 2 Sheets—Sheet 1.

B. G. ROYAL & W. F. GILES.
GRAIN CLEANING AND SCALPING MACHINE.

No. 540,193. Patented May 28, 1895.

Witnesses:
Nicholas M. Goodlett Jr
George W. Mills Jr

Inventors,
Belford G. Royal,
William F. Giles,
By their attorneys,
Walter F. Kenyon (No Model.) 2 Sheets—Sheet 2.
B. G. ROYAL & W. F. GILES.
GRAIN CLEANING AND SCALPING MACHINE.
No. 540,193. Patented May 28, 1895.
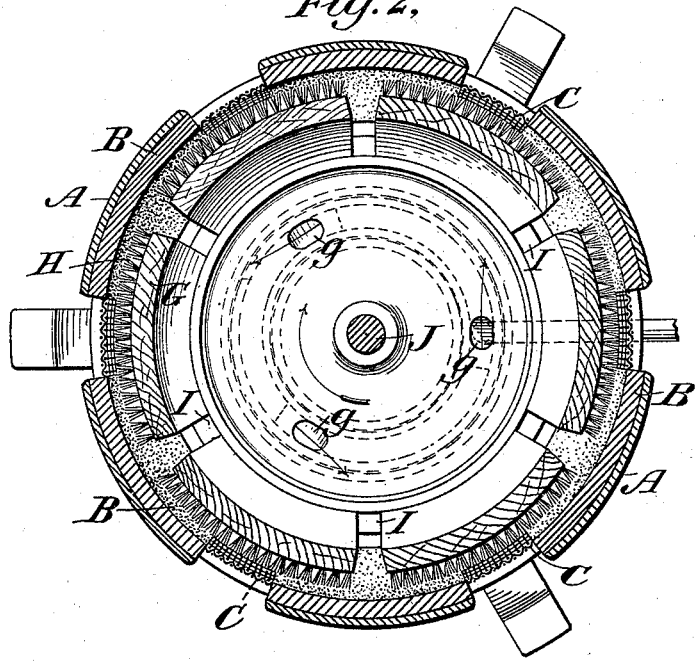
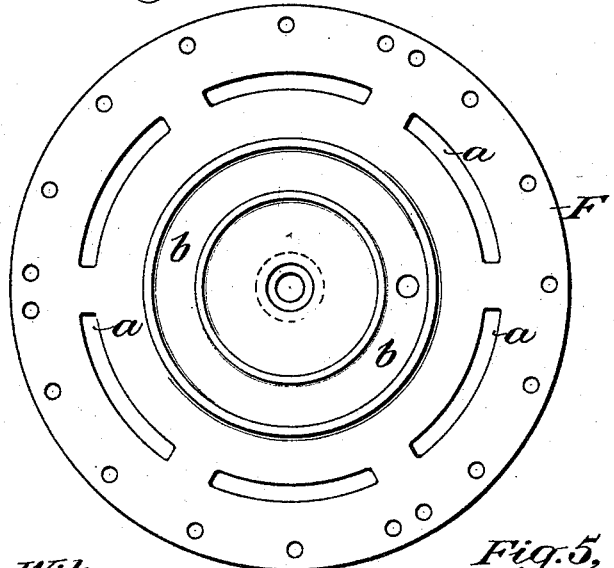
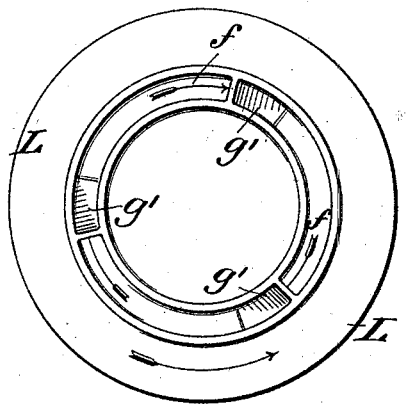
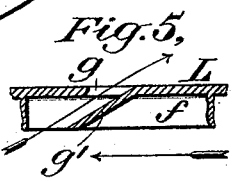
Witnesses:
Nicholas M. Goodlett
George W. Miller
Inventors:
Belford G. Royal,
William F. Giles,
By their Attorneys,
Witter & Kenyon

UNITED STATES PATENT OFFICE.

BELFORD G. ROYAL, OF CAMDEN, NEW JERSEY, AND WILLIAM F. GILES, OF CHESTER, PENNSYLVANIA, ASSIGNORS TO THE ARLINGTON CEREAL COMPANY, OF NEW JERSEY.

GRAIN CLEANING AND SCALPING MACHINE.

SPECIFICATION forming part of Letters Patent No. 540,193, dated May 28, 1895.

Application filed February 24, 1894. Serial No. 501,338. (No model.)

*To all whom it may concern:*

Be it known that we, BELFORD G. ROYAL, residing at Camden, county of Camden, and State of New Jersey, and WILLIAM F. GILES, residing at Chester, Delaware county, State of Pennsylvania, citizens of the United States, have invented a new and useful Grain Cleaning and Scalping Machine, of which the following is a specification.

Our invention relates to machines adapted to clean and to remove the coating or hull from grains of wheat, buckwheat, corn or other cereals or granular substances.

It has for its object to render possible the production of a finer grade of flour or meal, &c., than has heretofore been produced, by removing the coating from the grain before it is crushed and thereby preventing the intermingling of bran with the flour, meal or other final product to be produced.

Another object of the invention is to reduce the cost of producing the flour or meal by making it unnecessary to employ the usual bolting devices heretofore necessary to separate the bran from the crushed cereal, and also to render it unnecessary to employ the usual smut machines for cleaning the cereal grains before crushing them, these objects of the machines being effectually accomplished by our invention.

The invention has also for its object to enhance the value of any cereal or grain proposed to be used as a food product by cleaning and polishing the same.

The invention consists of a machine comprising a central drum mounted in a closely fitting casing between the opposing surfaces of which the grain is operated upon by the rotation of the drum or the casing or both.

It also consists of the adjustable bearings for supporting the rotatable drum.

In the drawings, in which like letters designate similar parts, Figure 1 is a vertical sectional view of a machine embodying our invention. Fig. 2 is a horizontal section on the line 2 2 of Fig. 1. Fig. 3 is a plan view of the upper side of the bottom plate of the casing. Fig. 4 is a plan view of the lower side of the bottom plate of the drum; and Fig. 5 is a horizontal sectional view of a portion of the bottom plate of the drum, showing a detail.

Referring now more particularly to the various features of the invention as shown in the drawings, A is a casing circular in cross section, the inner surface of which is provided with imperforate slabs B of some suitable material having an abrading surface such as milling stone. We preferably make these slabs of French or natural burr block, stone or sandstone. Between some or all of these slabs are openings closed by perforated or reticulated plates C, preferably made of wire netting. The top of the casing is closed by a plate D through which a grain chute E discharges, and the bottom plate F is provided with openings $a$, and its upper side with a circular trough $b$.

Within the casing A is mounted a drum G whose surface is provided with one or more yielding carriers H, which come close up to the inner surface of the casing. We have found that stiff bristles of wood set into the periphery of the drum so as to form a brush, as shown in the drawings, are best adapted for our purpose. We preferably employ a series of these brushes and provide openings I between them in the wall of the drum for the escape of air, as will be hereinafter explained. Instead of several brushes, of course one continuous brush might be used with air openings suitably arranged between the bristles of the brush. The drum, as shown in the drawings, is mounted on a rotatable shaft J passing through the drum and casing, and supported at its lower end by a bearing $c$, and at a point above the casing by a collar $d$ on a yoke K mounted on the top of the casing. This shaft carries a suitable driving wheel K' by which the shaft and drum are rotated. The bottom plate L of the drum is provided on its lower side with a circular trough $f$ adapted to fit closely inside the trough $b$ of the bottom plate F, and the trough $f$ is provided with openings $g$ having bonnets $g'$. An air fan M is connected with the troughs $b$ and $f$ so as to deliver a current of air within the troughs which, when the drum is rotated, is deflected by the bonnets $g'$ up through the openings $g$ inside the drum, and passes out its side openings I and through the screens C in the side of the casing A to the outer air. The troughs $b$ and $f$ form a coupling between the exterior and the interior of the drum. This current of air serves to carry off the dust or other impurities taken from the grain and also to keep the grain cool and thus prevents the heat due to friction on the grain from burning the grain. A receptacle N is provided beneath the bottom plate F to catch the grain after it is scalped.

The drum is designed to rotate very rapidly, and in order to reduce friction the lower end of the shaft J is turned to a conical point where it rests in the bearing $c$. A collar $d'$ is preferably fixed on the shaft above the casing and is supported on anti-friction balls resting on a flange of a sleeve $d^2$ which surrounds the shaft and is held from turning by the collar $d$ of the yoke K. This provides two supporting bearings for the shaft, and distributes the weight of the shaft and drum otherwise carried by the bearing $c$. These supporting bearings are arranged preferably one on each side of the drum and one on each side of the center of gravity of the shaft and drum, as shown, with the weight of the shaft and drum distributed between them. The drum and shaft by this arrangement are not only held free from lateral oscillation during rotation but may be rotated at a much higher speed with less expenditure of power than if only one lower bearing $c$ were used.

In some cases we may suspend the entire weight of the rotating body from the upper bearing, employing the lower bearing simply to prevent lateral oscillation. Again, these bearings may be arranged on one side of the drum if desired, but it is preferable that in any case they be arranged one on each side of the center of gravity of the rotating body. Of course more than two bearings could be employed if found convenient and desirable.

The operation of the machine when it is used to scalp or cut off the hull or coating of the grain is as follows:—The grain is delivered through the chute E upon the top of the rapidly revolving drum, and is carried by centrifugal force to the sides of the casing. It is then caught by the brushes and whirled round between them and the abrading surfaces B of the casing, and the hull is scraped off. The current of air from the fan as it passes through the openings I of the drum out through the screens C, carries with it the bran and also whatever dust or other impurities may be mingled with the grain, and also keeps the grain cool. The grain gradually works its way to the bottom of the casing, and, having been freed from its hull, passes through the openings $a$ into the receptacle N.

It will be noticed that when the machine is operated and the annular space between the drum and casing is filled with grain, this grain forms a thin moving annular wall and that the current of air from the fan is directed across this wall and in its passage is therefore able to carry off in the most effective manner both those impurities that were originally mingled with the grain and also those impurities that are cut or scraped off the grain by the operation of the machine. This forcing of a current of air through a coupling connecting the drum and casing and across the wall of grain we consider very important.

In order that the machine may be adapted to operate upon grain of different sizes, or may cut more or less deeply into the hull of grain of any given size, we make the casing and drum conical in shape, as shown in the drawings, and provide means for adjusting them relatively whereby the space between the drum and casing may be regulated. The means we have shown for the purpose comprises a lever O pivoted at $o$ on the yoke K, and engaging at one end the sleeve $d$ on the shaft. The other end of the lever O has a screw P and nut $p$ for adjusting it. The bearing $c$ for the lower end of the shaft is also adjustable by means of the screw $c'$.

Our machine may also be employed to polish granular substances without taking off the coating of the grains. It is often thus desirable to polish rice, coffee, &c. In using our machine for this purpose it would be preferable to have the abrading surfaces B of some fine smooth grained material so as not to unduly cut the grains of the substance being polished.

Other means than those shown may of course be employed for relatively adjusting the drum and casing, and instead of adjusting the drum the casing may be adjusted.

Various changes could be made in the arrangement of the parts of the machine by any one skilled in the art without departing from the spirit of our invention. For example, the shaft J might be driven from below the casing; the grain chute might deliver grain through the side instead of through the top of the casing, and the devices for supplying and directing the air currents could be variously modified. Moreover, while we have shown the casing as stationary and the drum as rotating alone, and prefer this arrangement, it is of course to be understood that we do include within the scope of our invention a casing mounted to rotate about a stationary drum or a casing mounted to rotate in one direction and a drum mounted to rotate in the opposite direction. In all of these arrangements the drum and casing are relatively rotatable.

What we claim, and desire to secure by Letters Patent, is—

1. In a grain cleaning and scalping machine, the combination with a casing provided on its inner side with one or more suitable abrading surfaces and with one or more screened openings adjacent to the abrading surfaces, of a hollow drum mounted within the casing and provided with one or more abrading surfaces approaching the abrading surfaces of the casing, and also provided with one or more openings adjacent to the said abrading surfaces, whereby an annular space is inclosed between the casing and drum, said space being provided with suitable inlet and outlet openings for the grain, the end plates of the drum and casing having on their opposite sides registering troughs communicating with the interior of the drum, and means for forcing a current of air from the exterior to the interior of the drum and across the said annular space, the drum and casing being relatively rotatable, substantially as set forth.

2. In a grain cleaning and scalping machine, the combination with a stationary conical casing provided with screened openings around its sides, and slabs of milling stone on the inner side of the casing adjacent to the screened openings, of an adjustable driving shaft having one or more supporting bearings, a conical drum mounted on the shaft within the casing and provided with brushes on its outer side approaching the inner side of the casing, and provided with openings between the brushes, the end plates of the drum and casing having on their opposite sides registering troughs communicating with the interior of the drum, and a fan communicating with the troughs, the casing being provided with suitable inlet and outlet openings for the grain, substantially as set forth.

3. In a grain cleaning and scalping machine, the combination of a conical stationary outer casing provided with an abrading surface or surfaces, a conical rotatable drum mounted on a substantially vertical axis within the casing and provided with an abrading surface for the grain, the axis of the said drum being supported by a plurality of vertical bearings one above the other, each of which is vertically adjustable, one of the bearings comprising a suitably supported vertically adjustable sleeve provided with a flange carrying ball bearings substantially as set forth.

4. In a grain cleaning and scalping machine, the combination of a conical stationary outer casing provided with an abrading surface or surfaces, a conical rotatable drum mounted on a substantially vertical axis within the casing and provided with an abrading surface for the grain, the drum being adjustable to and from the casing by means of a vertically adjustable bearing comprising a suitably supported vertically adjustable sleeve provided with a flange carrying ball bearings upon which the spindle of the drum is rotatably sustained, substantially as set forth.

5. In a grain cleaning and scalping machine, the combination of a conical stationary outer casing provided with an abrading surface or surfaces of stone, a conical rotatable drum mounted on a substantially vertical axis within the casing and provided with a brush or brushes, a yoke K supported by the casing and provided with a sleeve $d^2$ having a flange carrying ball bearings, the axis of the drum passing through the sleeve and rotatably supported by the ball bearings, and means for adjusting the sleeve whereby the drum and casing may be relatively adjusted, substantially as set forth.

In testimony whereof we have signed our names to this specification in the presence of two subscribing witnesses.

BELFORD G. ROYAL.
WILLIAM F. GILES.

Witnesses:
JAMES M. ROYAL,
JAMES V. GODFREY.